United States Patent
Takagi et al.

(10) Patent No.: US 11,009,648 B2
(45) Date of Patent: May 18, 2021

(54) DISPLAY DEVICE AND GAME MACHINE

(71) Applicant: Omron Corporation, Kyoto (JP)

(72) Inventors: Yoshihiko Takagi, Kyoto (JP); Jun Kishimoto, Gifu (JP); Takahiro Morichi, Shiga (JP)

(73) Assignee: Omron Corporation, Kyoto (JP)

( * ) Notice: Subject to any disclaimer, the term of this patent is extended or adjusted under 35 U.S.C. 154(b) by 103 days.

(21) Appl. No.: 16/489,860

(22) PCT Filed: Nov. 28, 2017

(86) PCT No.: PCT/JP2017/042641
§ 371 (c)(1),
(2) Date: Aug. 29, 2019

(87) PCT Pub. No.: WO2018/168102
PCT Pub. Date: Sep. 20, 2018

(65) Prior Publication Data
US 2020/0233140 A1 Jul. 23, 2020

(30) Foreign Application Priority Data
Mar. 14, 2017 (JP) .............................. JP2017-049219

(51) Int. Cl.
*F21V 8/00* (2006.01)
*A63F 13/25* (2014.01)

(52) U.S. Cl.
CPC ............ *G02B 6/0036* (2013.01); *A63F 13/25* (2014.09)

(58) Field of Classification Search
USPC ........................................................ 463/31
See application file for complete search history.

(56) References Cited

U.S. PATENT DOCUMENTS

| 8,284,218 | B2 | 10/2012 | Yoshida |
| 2007/0279359 | A1 | 12/2007 | Yoshida et al. |
| 2009/0296017 | A1* | 12/2009 | Itoh .................. G02F 1/133603 349/61 |
| 2011/0050556 | A1 | 3/2011 | Bae et al. |
| 2011/0050735 | A1 | 3/2011 | Bae et al. |

(Continued)

FOREIGN PATENT DOCUMENTS

| CN | 101093657 A | 12/2007 |
| CN | 102472914 A | 5/2012 |

(Continued)

OTHER PUBLICATIONS

International Search Report issued in PCT/JP2017/042641 dated Feb. 20, 2018 (1 page).

(Continued)

*Primary Examiner* — Pierre E Elisca
(74) *Attorney, Agent, or Firm* — Osha Bergman Watanabe & Burton LLP

(57) ABSTRACT

To achieve more natural image expression. A display device (1) is provided with a light guide plate (4) which displays a predetermined image having a tone caused by changing the amount of light emitted from each of pixel regions including one or more light exit structures (43), and the amount of light emitted from the pixel regions displaying the tone in a predetermined range is randomly set so as to be a first light amount value or a second light amount value greater than the first light amount value.

11 Claims, 7 Drawing Sheets

(56) References Cited

U.S. PATENT DOCUMENTS

| | | | |
|---|---|---|---|
| 2011/0051037 A1 | 3/2011 | Kim et al. | |
| 2011/0051397 A1 | 3/2011 | Bae et al. | |
| 2012/0235891 A1* | 9/2012 | Nishitani | G02B 6/0076 345/102 |
| 2013/0265802 A1 | 10/2013 | Kamikatano et al. | |
| 2015/0029442 A1* | 1/2015 | Koike | G02F 1/1336 349/65 |
| 2015/0092444 A1 | 4/2015 | Takagi et al. | |
| 2015/0168627 A1 | 6/2015 | Takagi et al. | |
| 2017/0115441 A1* | 4/2017 | Takata | G02B 6/002 |
| 2017/0248749 A1 | 8/2017 | Fujita et al. | |
| 2017/0285245 A1 | 10/2017 | Fujita et al. | |
| 2018/0136386 A1* | 5/2018 | Takata | G02F 1/0105 |
| 2019/0033794 A1* | 1/2019 | Hiraide | G06F 3/0346 |
| 2020/0183073 A1* | 6/2020 | Osumi | G02B 6/00 |

FOREIGN PATENT DOCUMENTS

| | | |
|---|---|---|
| CN | 102483538 A | 5/2012 |
| CN | 103080995 B | 11/2015 |
| JP | H11-231797 A | 8/1999 |
| JP | 2015-088489 A | 5/2015 |
| JP | 2015-118128 A | 6/2015 |
| JP | 2016-122162 A | 7/2016 |
| JP | 2016-122171 A | 7/2016 |

OTHER PUBLICATIONS

Written Opinion of the International Searching Authority issued in PCT/JP2017/042641 dated Feb. 20, 2018 (16 pages).
Office Action issued in Chinese Application No. 201780085907.4; dated Dec. 29, 2020 (14 pages).

* cited by examiner

DISPLAY DEVICE AND GAME MACHINE

TECHNICAL FIELD

The present disclosure relates to a display device including a light source and a light guide plate, and a game machine including the display device.

BACKGROUND ART

A light guide plate is conventionally known which displays a predetermined image by guiding light incident from a light source and emitting a part of the light from a light exit surface. In addition, various techniques for more clearly displaying an image on a light guide plate have also been developed. For example, Patent Document 1 discloses a technique for enhancing the tone in an outline portion of an image displayed on a light guide plate. Further, Patent Document 2 discloses a technique for expressing the tone by continuously changing the direction of a pattern for expressing an image formed on a light guide plate and changing the directivity of light emitted from the light guide plate.

PRIOR ART DOCUMENTS

Patent Documents

Patent Document 1: Japanese Unexamined Patent Publication No. 2015-118128 (published on Jun. 25, 2015)
Patent Document 2: Japanese Unexamined Patent Publication No. 2015-088489 (published on May 7, 2015)

SUMMARY OF THE INVENTION

Problems to be Solved by the Invention

However, in the conventional techniques as described above, it has been difficult to naturally express the stereoscopic effect of the image. For example, the technique described in Patent Document 1 is less effective even when applied to the image expression in which the tone continuously changes like gradation. On the other hand, since the technique described in Patent Document 2 is a technique for continuously changing the tone, the effective range in its application is limited.

An object of one embodiment of the present invention is to achieve a display device and the like where more natural image expression is possible.

Means for Solving the Problem

In order to solve the above problems, a display device according to one aspect of the present invention includes: a light source; and a light guide plate configured to guide light incident from the light source and emits a part of the light from a light exit surface. The light guide plate is provided with pixel regions each including one or more of light exit structures configured to change a direction of the incident light and emit the incident light from the light exit surface, the light guide plate being configured to display a predetermined image that has a tone caused by varying an amount of light emitted from each of the pixel regions. The amount of light emitted from the pixel region displaying the tone in a predetermined range is randomly set so as to be a first light amount value or a second light amount value greater than the first light amount value.

Effect of the Invention

According to one aspect of the present invention, more natural image expression is possible on the display device.

MODE FOR CARRYING OUT THE INVENTION

First Embodiment

<<Overview of Display Device>>

Figure 1:
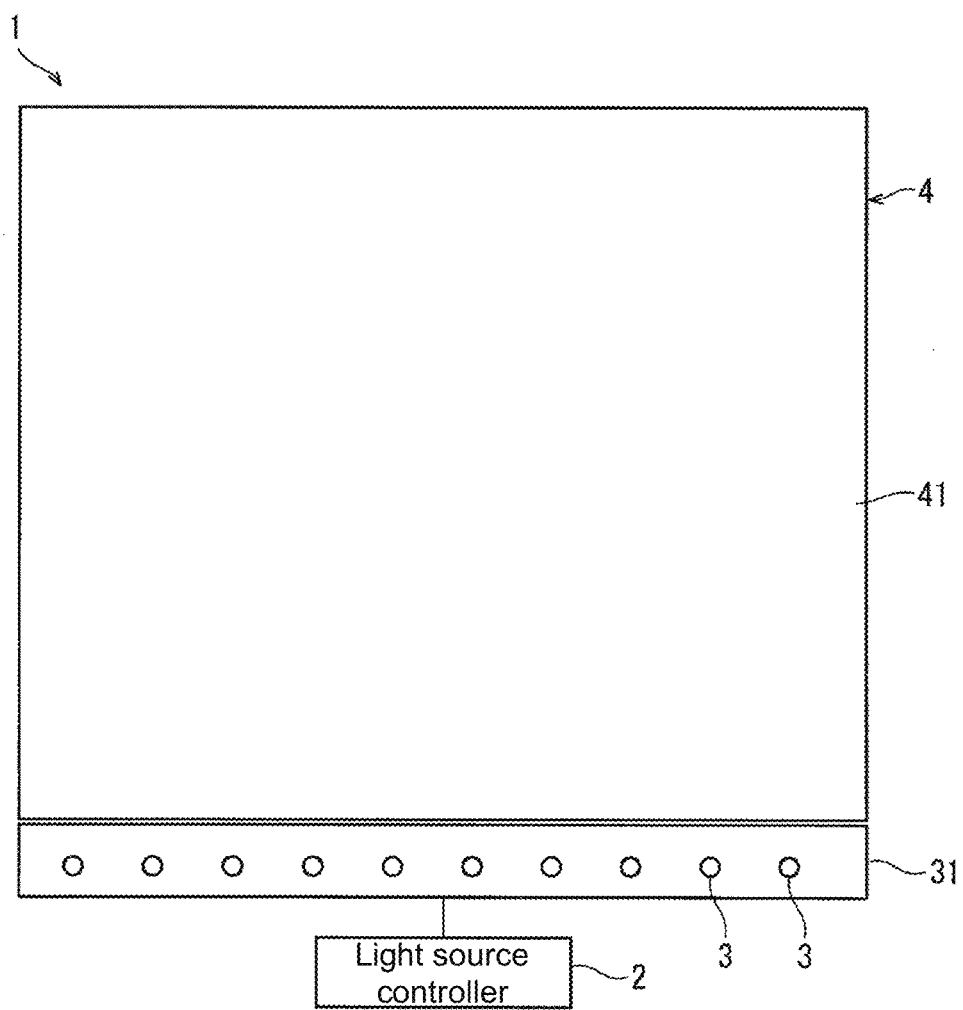
FIG. 1 is a plan view illustrating the outline of the display device according to a first embodiment of the present invention.

Hereinafter, a first embodiment of the present invention will be described with reference to FIGS. 1 to 6. FIG. 1 is a plan view illustrating the overview of the configuration of a display device 1 according to the embodiment. The display device 1 includes a light source controller 2, one or more light sources 3, and a light guide plate 4 as illustrated. The light source controller 2 controls the light emission of the light source 3. The one or more light sources 3 form a light source group 31. Each light source 3 emits light under the control of the light source controller 2. The light guide plate 4 guides light incident from the light source 3 and exit at least a part of the light from a light exit surface 41. In order to exit the incident light from the light exit surface 41, a light exit structure is formed on the surface (hereinafter referred to as the back surface) opposite to the light exit surface 41 in the light guide plate 4.

<<Light Exit Structure>>

Figure 2:
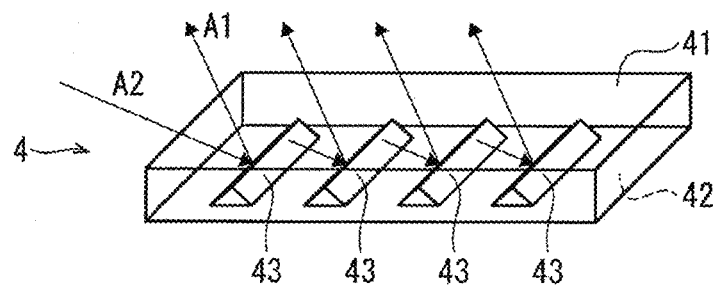
FIG. 2 is a view illustrating an example of the shape and arrangement of light exit structures formed in a light guide plate of the display device.

FIG. 2 is a view illustrating an example of the shape and arrangement of light exit structures 43 formed in the light guide plate 4. As illustrated, on a back surface 42 of the light guide plate 4, a plurality of convex light exit structures 43 are formed from the back surface 42 toward the inside of the light guide plate 4. The light exit structure 43 is formed, for example, by recessing the back surface of the light guide plate 4 by laser processing or by forming a master mold and transfer-molding the master mold into the light guide plate 4.

The light exit structure 43 changes the direction of light incident on the light guide plate 4 from the light source 3 and emits the light from the light exit surface 41. As illustrated in FIG. 2, the light guide plate 4 is formed with a plurality of convex light exit structures 43 directed from the back surface 42 to the inside of the light guide plate 4. Each of the plurality of light exit structures 43 is configured so that the direction of light with the maximum intensity among light to be emitted is the same direction of an arrow A1. Hence each of the plurality of light exit structures 43 changes the direction of the light (arrow A2) having entered the inside of the light guide plate 4 so that the direction of the light with the maximum intensity among the light to be emitted is the same direction of the arrow A1. As a result, from the light guide plate 4, the light with the maximum light intensity is emitted in the same direction of the arrow A1.

Incident light from the light source 3 propagates inside the light guide plate 4 while totally reflecting inside the light guide plate 4, and when striking the light exit structure 43, the incident light is reflected in the direction of emission from the light exit surface 41. The light exit structures 43 are formed at such positions and in such a number that a predetermined image can be seen by the reflected light from the light exit structure 43 when a user looks at the light exit surface 41 of the light guide plate 4. Hereinafter, the settings of the formed positions and the number of light exit structures 43 will be referred to as a "pattern." The light guide plate 4 can display an image in accordance with the pattern of the light exit structure 43 on the light exit surface 41.

<<Tone Expression of Display Image>>

Figure 3:
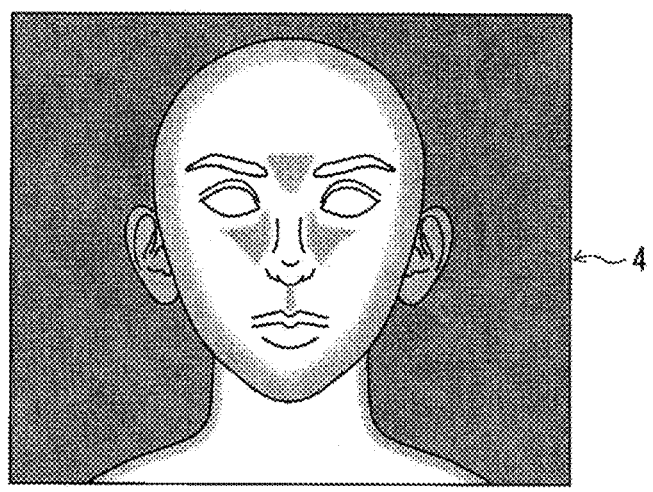
FIG. 3 is a view illustrating an example of an image displayed on the light guide plate.

FIG. 3 is a view illustrating an example of an image (hereinafter referred to as a display image) displayed on the light guide plate 4. The display image is a predetermined image having tones. The light guide plate 4 expresses the shade of the display image by emitting light in an amount in accordance with a value (e.g., 0 to 255) of a tone set for each pixel region of the display image. Note that the pixel region indicates a unit of depiction of the tone in the display image.

Figure 4:
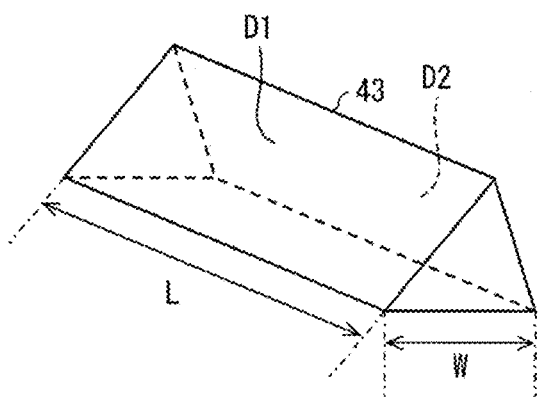
FIG. 4 is a view illustrating an example of the shape of the light exit structure.

FIG. 4 is a view illustrating an example of the shape of the light exit structure 43. The light exit structure 43 includes optical surfaces D1, D2 that change the direction of the incident light. A first direction vertical to the direction of light incident from the light source 3 is a length L, and a second direction parallel to the direction is a width W, as viewed from the light exit surface 41 side. The length L is preferably about 0.02 mm to 0.2 mm, and the width W is preferably about 0.01 mm to 0.02 mm.

It is preferable to control the amount of light in each pixel region of the display image by changing the width W and the length L of the light exit structure 43 (in particular, changing the length L). For example, in the case of the light exit structure 43 illustrated in FIG. 4, at least either the length L or the width W of each of the light exit structure 43 arranged in a predetermined pattern is made different for each light exit structure 43 to adjust the light amount in each pixel region.

Thereby, for example, when the shape of the light exit structure 43 is formed by moving a cutting tool in the direction of the length L and performing cutting, the movement amount in the direction of the length L at the cutting with the cutting tool is controlled, so that it is possible to set the length of the optical surface in the second direction. Therefore, the light exit structure 43 can be manufactured by relatively simple control.

Thereby, for example, when the shape of the light exit structure is formed by moving the cutting tool in the direction of the length L and performing cutting, the pressing amount at the cutting with the cutting tool is controlled so that it is possible to set the length of the optical surface in the direction of the width W. The light exit structure can thus be manufactured by relatively simple control.

<<Tone and Luminance of Displayed Image>>

Figure 5:
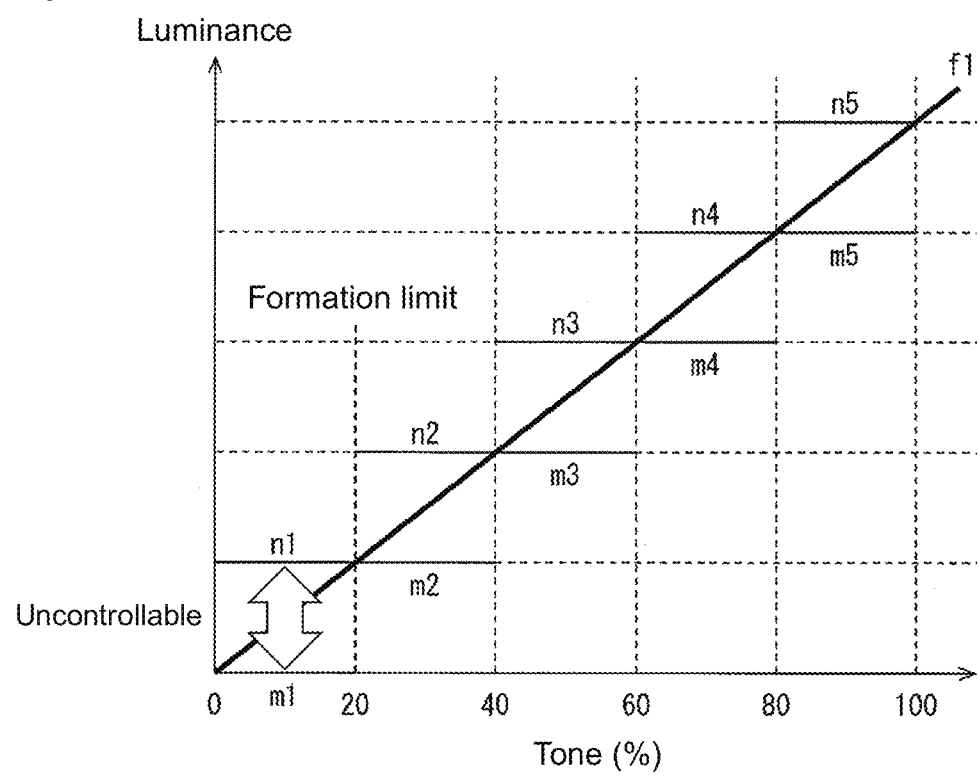
FIG. 5 is a graph illustrating an example of the relation between the tone and luminance of a pixel region of the image.

FIG. 5 is a graph illustrating an example of the relation between the tone and luminance of the pixel region. A horizontal axis illustrates a ratio of the tone to the maximum value (e.g., 255), and a vertical axis illustrates the luminance of the pixel region. In the example of FIG. 5, it is assumed that the number of light exit structures 43 included in each pixel region is constant.

As indicated by a solid line f1 in FIG. 5, it is ideal that the value of the tone set at the pixel and the luminance are in direct proportion to each other. However, the manufacturing accuracy of the light guide plate 4 is limited, and it is not possible to completely associate the tone change with the change in amount of emitted light as in f1. This is because the light exit structure is a minute structure, and there is a limit to the accuracy in molding by laser or mold formation. For example, when the tone value is set to 20% to 30% or less, particularly 10% or less, of the maximum value, the above manufacturing accuracy is particularly reduced. This is because the smaller the tone value, the smaller the size of the light exit structure 43. For example, when the light exit structure 43 is formed into the shape illustrated in FIG. 4, it is difficult to form with stable accuracy the light exit structure 43 having a length L of less than 0.02 mm or a width W of less than 0.01 mm.

In contrast, in the light guide plate 4 according to the embodiment, the light exit structure 43 is formed to be randomly set so that the amount of light emitted from the pixel region displaying the tone in the predetermined range is the first light amount value or the second light amount value greater than the first light amount value.

In addition, the light exit structure 43 is formed in the light guide plate 4 so that the entire tone range of the displayed image is divided into a plurality of partial tone ranges, and the first light amount value and the second light amount value are set for each of the partial tone ranges. The division method and the number of divisions of the partial tone range are not particularly limited but are preferably determined in accordance with the manufacturing accuracy limit described above. For example, when a transfer rate at a tone value of 20% or less of the maximum value is particularly low, the entire tone range may be divided into five or less partial tone ranges. As a result, the size of the smallest light exit structure 43 can be made 20% or more. When a transfer rate at a tone value of 10% or less of the maximum value is particularly low, the entire tone range may be divided into 10 or less partial tone ranges. As a result, the size of the smallest light exit structure 43 can be made 10% or more. Hence it is possible to provide the light guide plate 4 provided with the light exit structures 43 with high accuracy and stability.

The example of FIG. 5 illustrates a case where the tone value is divided into five partial tone ranges of less than 20%, 20% or more and less than 40%, 40% or more and less than 60%, 60% or more and less than 80%, and 80% or more. In this case, the light amount value of each pixel is set randomly to either the first light amount value (n1 to n5) or the second light amount value (m1 to m5) of the partial tone range in which the tone value of the pixel is included. Then, in the light guide plate 4, the light exit structure 43 is formed in the pattern so that the light amount value set as described above is obtained for each pixel.

In the light guide plate 4, the second light amount value of the highest partial tone range is preferably three times the second light amount value of the lowest partial tone range. As a result, the difference between the light amount values of the highest partial tone range and the lowest partial tone range can be increased to achieve the display of an image having sufficient tone expression.

Assuming that the difference between the second light amount value of a certain partial tone range and the second light amount value of a partial tone range that is one level lower than the partial tone range is taken as a light amount value difference, light amount value differences in the entire tone range may not be constant.

Figure 6:
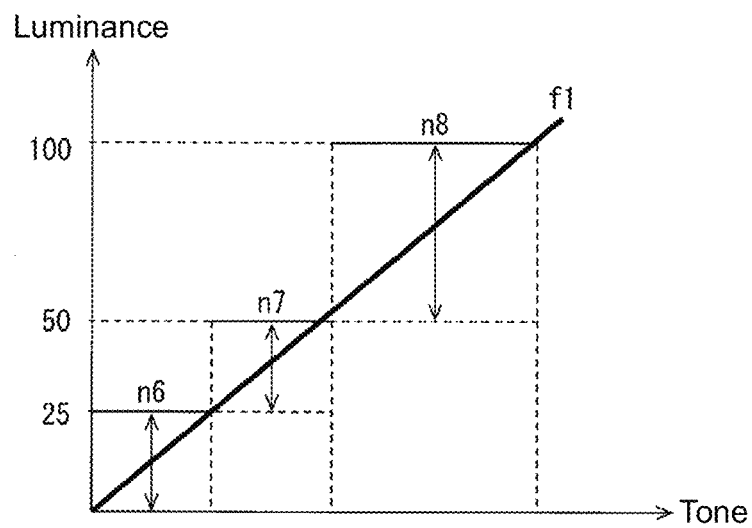
FIG. 6 is a graph illustrating another example of the relation between the tone and luminance of the pixel region.

FIG. 6 is a graph illustrating another example of the relation between the tone and the luminance of the pixel region. In the illustrated example, the partial tone range is divided into three, and the second light amount values n6 and n7 and the second light amount value n7 and n8 have different light amount value differences. As described above, by setting the light amount value difference, more natural tone expression can be achieved. For example, by increasing the light amount value difference as the partial tone range becomes higher, it is possible to achieve a display in which the tone expression in a lower tone range is more delicate.

<<Example of Tone Expression>>

Figure 7:
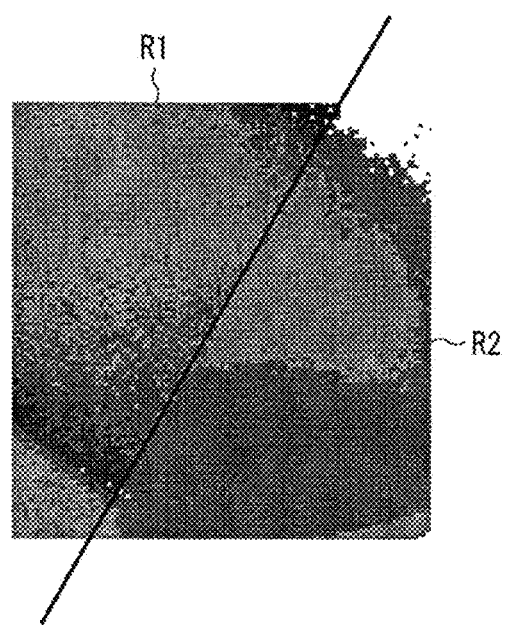
FIG. 7 is a view comparing a case where a certain image is realized on the above light guide plate and a case where the image is realized on a conventional light guide plate.

FIG. 7 is a view comparing a case where a certain image is achieved on the light guide plate 4 according to the embodiment and a case where the image is achieved in the conventional light guide plate. A region R1 in the figure illustrates a portion of the image when a certain image is achieved by the light guide plate 4. A region R2 illustrates the same region as R1 when the same image is achieved by the conventional light guide plate.

As can be seen by comparing the regions R1, R2, on the conventional light guide plate, even when image expression in which the tone continuously changes like gradation is tried to be performed, the tone change is not made continuously. This is because, due to the above-described limitation of the manufacturing accuracy of the light guide plate, it is impossible to completely associate the tone change with the change in amount of emitted light. Therefore, as illustrated in the region R2, on the conventional light guide plate, the change in amount of emitted light with respect to the tone change is made stepwise, so the boundary region of the tones becomes conspicuous and the gradation becomes unnatural.

On the other hand, the pattern formation of the light exit structure 43 on the light guide plate 4 according to the embodiment is quite possible even when the manufacturing accuracy is relatively low. Then, with the light guide plate 4 according to the embodiment, the amount of emitted light is randomly set to be the first light amount value or the second light amount value for each partial tone range. Therefore, as illustrated in the region R1, the boundary of the tones can be blurred, so that the image expression like gradation can be made more natural.

Second Embodiment

In the light guide plate 4, the number of light exit structures 43 included in each pixel region may be made different to change the amount of light emitted from each pixel region. Hereinafter, the number of light exit structures 43 in each pixel region is referred to as "pitch."

Figure 8:
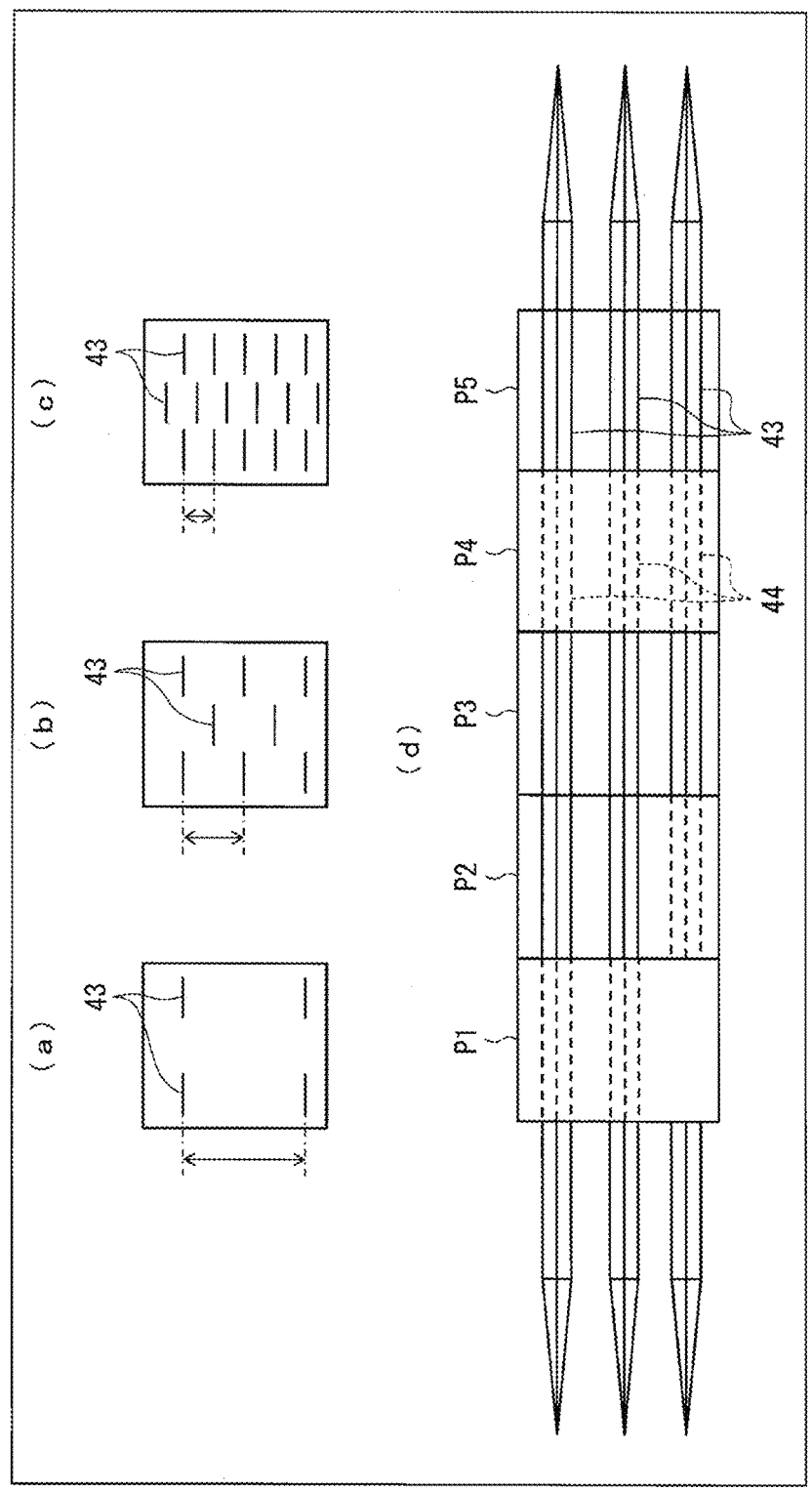
FIGS. 8(a) to 8(c) are diagrams illustrating changes in the pitch of the pixel region.
FIG. 8(d) is a view illustrating a light guide plate provided with light exit structure regions.

FIGS. 8(a) to 8(c) are diagrams illustrating changes in the pitch of the pixel region. The amount of light emitted from the pixel region can be changed by changing the pitch as illustrated in the drawing, so that the amount of emitted light can be changed without changing the shape of the light exit structure 43. Thus, at the time of manufacturing the light exit structure 43, it is only necessary to form the light exit structure 43 in the same shape by the same control and to change the number of light exit structures 43 for each pixel region. This can simplify the control of manufacturing depending on the manufacturing method.

Further, in the light guide plate 4, a plurality of light exit structure regions extending in a first direction (e.g., the length L direction in the example of FIG. 4) vertical to the direction of light incident from the light source 3 may be provided in parallel so as to straddle a plurality of pixel regions arranged in the first direction. Then, the number of light exit structures 43 included in the pixel region may be made different based on whether or not to provide the light exit structure 43 in the light exit structure region.

FIGS. 8(a) to 8(d) are views illustrating the light guide plate 4 provided with light exit structure regions 44. The groove-shaped light exit structure region 44 is provided in each of pixel regions P1 to P5. A dotted line portion of the light exit structure region 44 is a portion where the light exit structure 43 is not provided, and a solid line portion is a portion where the light exit structure 43 is provided. In the illustrated example, zero light exit structures 43 is provided in the pixel regions P1, P4, two in the pixel region P2, and three in the pixel regions P3, P5.

With the above configuration, for example, it is possible to form the shape of the light exit structure by performing cutting at a location where the light exit structure is to be provided while moving a cutting tool along the light exit structure region extending in the first direction. The light exit structure can thus be manufactured by relatively simple control.

Note the light exit structure region 44 may be provided not in the entire pixel region aligned in the first direction in the light guide plate 4 but in a portion of the entire pixel region. For example, as in the pixel region P1, there may be a pixel region in which the number of light exit structure regions 44 is smaller than in each of the pixel regions P2 to P5.

Third Embodiment

The light exit structure 43 formed in the light guide plate 4 may have a shape other than the shape illustrated in FIGS. 2 and 3. In addition, the number of light exit structures 43 included in each of the pixel regions of the light guide plate 4 may be made the same, and the shapes of the light exit structures 43 may be made different, to change the amount of light emitted from the pixel region.

FIGS. 9(a) to 9(e) are diagrams illustrating another example of the shape of the light exit structure 43. As described above, when the shape of the light exit structure 43 is different, the amount of light emitted from the light exit structure 43 is also different. It is thus possible to change the amount of light emitted from each pixel region (that is, the luminance of each pixel region) of the display image while making the same the number of light exit structures 43 in each pixel region.

Then, by designing the light guide plate 4 in this manner, for example at the time of manufacturing the light guide plate 4, the light exit structures 43 can be formed at equal intervals. This can simplify the control at the time of manufacturing depending on the manufacturing method.

Figure 9:
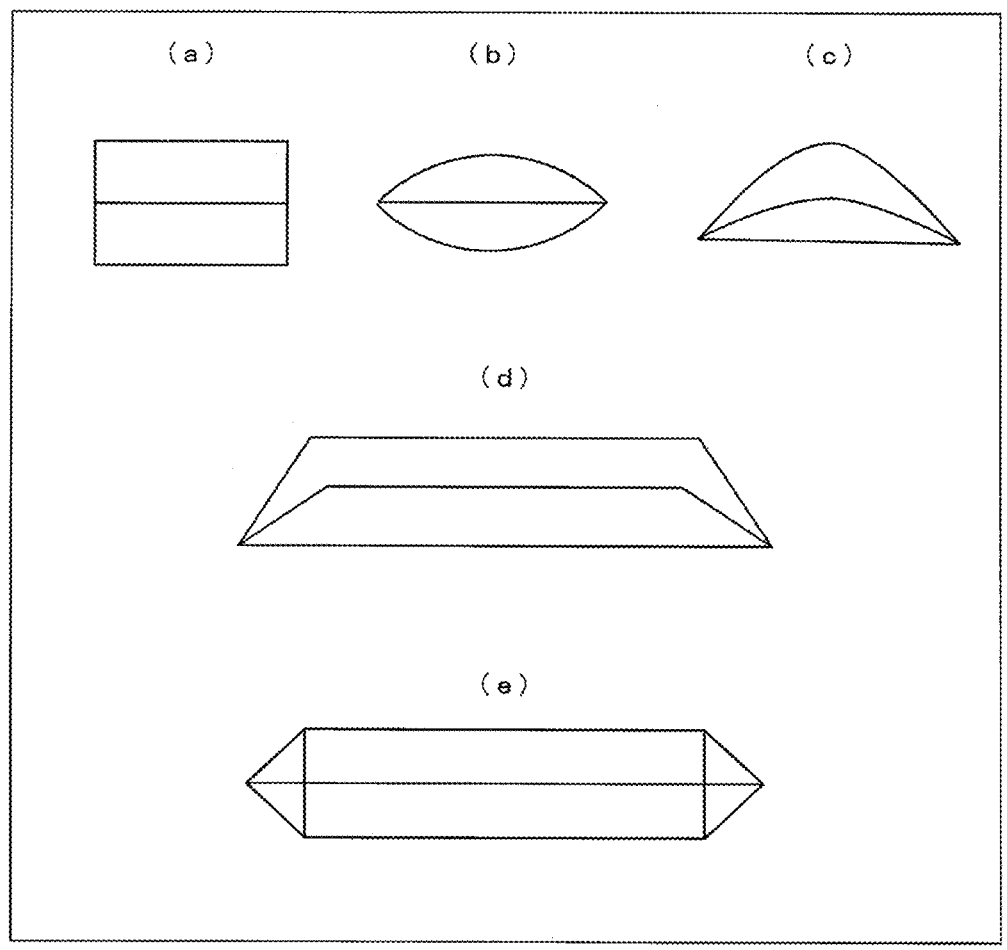
FIGS. 9(a) to 9(e) are views illustrating other examples of the shape of the light exit structure.
Figure 10:
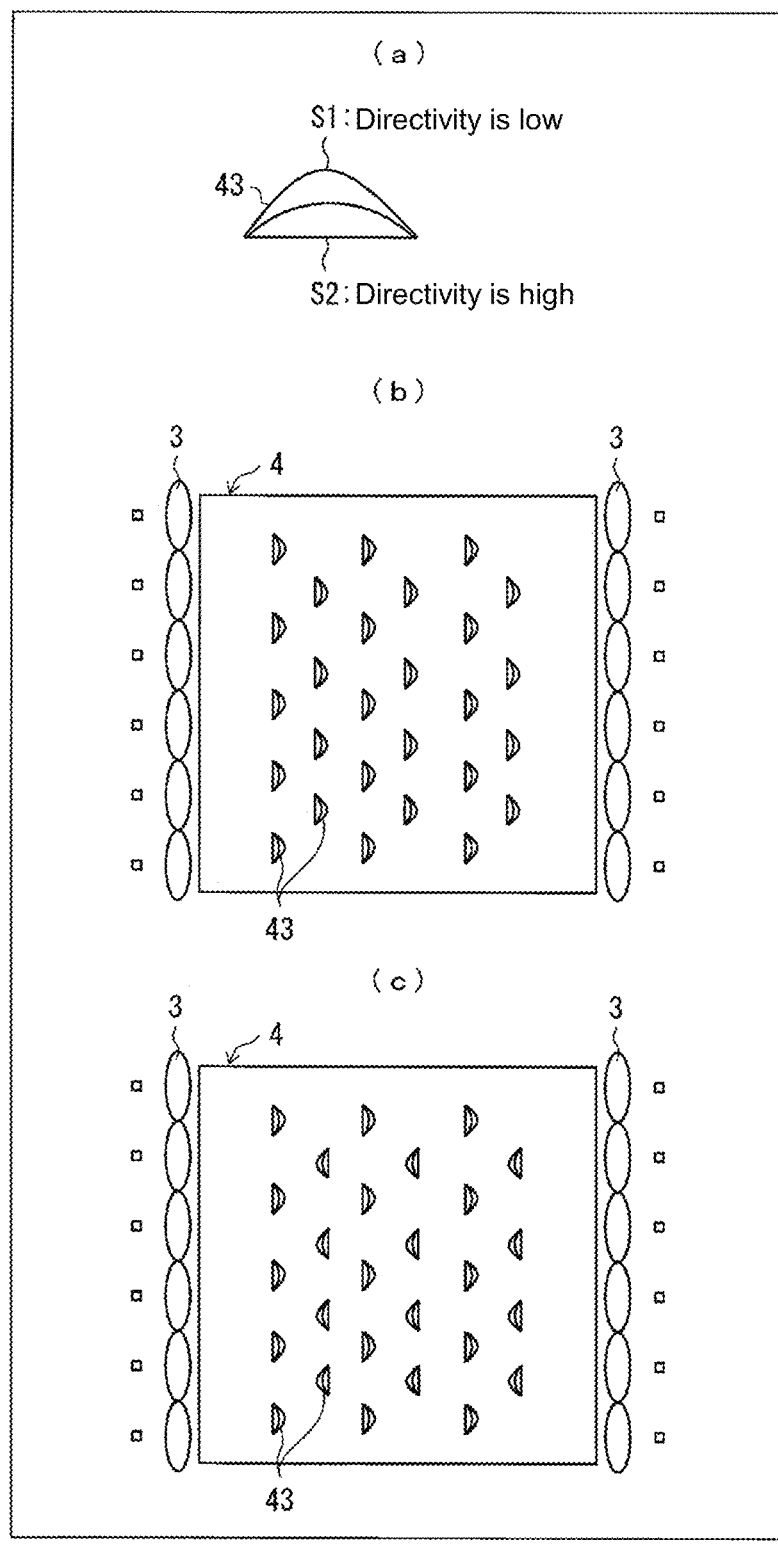
FIG. 10(a) is a view for explaining the relation of the directivity of reflected light with respect to the light exit structure illustrated in FIG. 9(c).
FIGS. 10(b) and (c) are views each illustrating an arrangement example of the light exit structures illustrated in FIG. 10(a) in the light guide plate.

FIG. 10(a) is a view for explaining the relation of the directivity of reflected light with respect to the light exit structure 43 illustrated in FIG. 9(c). As illustrated in FIG. 9(c) and FIG. 10(a), when the light exit structure 43 has a curved surface, the diffusion angle of the reflected light differs between the curved surface and the flat surface. For example, light emitted from a reflective surface S1 illustrated in FIG. 10(a) diffuses at a wider angle than the light emitted from the reflective surface S2. Hence the directivity of the light emitted from the reflective surface S1 is lower than the directivity of the light emitted from the reflective surface S2.

FIGS. 10(b) and (c) are views each illustrating an arrangement example of the light exit structures 43 illustrated in FIG. 10(a) in the light guide plate 4. As described above, in the light exit structure 43 illustrated in FIG. 10(a), the directivity of the emitted light differs between the reflective surfaces S1 and S2. Therefore, as illustrated in FIG. 10(b), in the case of the light guide plate 4 in which the light exit structures 43 are aligned in the same direction, when the light sources 3 are provided on both sides in order to enhance the luminance, the degree of diffusion of the reflected light when light is applied from each side differs between the side where the reflective surfaces S1 are aligned and the side where the reflective surfaces S2 are aligned. Therefore, for example, when the user looks at the light exit surface 41 of the light guide plate 4, the angle at which the display image can be viewed is narrow.

On the other hand, as illustrated in FIG. 10(c), in the case of the light guide plate 4 in which the light exit structures 43 are aligned alternately, when light is applied from each side of the light source 3, the degree of diffusion of the reflected light is the same between the side where the reflective surfaces S1 are aligned and the side where the reflective surfaces S2 are aligned. Therefore, when the user looks at the light exit surface 41 of the light guide plate 4, the angle at which the display image can be viewed is wide. As described above, by arranging the light exit structures 43 in the arrangement illustrated in FIG. 10(c), it is possible to achieve both the viewing angle of the display device 1 and the luminance.

Fourth Embodiment

The display device 1 according to each of the above embodiments may be provided in a game machine. Hereinafter, a fourth embodiment of the present invention will be described in detail. A game machine according to the embodiment includes a display device 1. The game machine causes the light guide plate 4 to display an image by controlling the light source controller 2 of the display device 1 in accordance with the progress of a game. Note that the display device 1 is preferably disposed so as to be located in front of the eyes of the user who operates the game machine. The type of game machine is not particularly limited, and may, for example, be a pachinko machine and a slot machine.

(Additional Items)

In order to solve the above problems, a display device according to one aspect of the present invention includes: a light source; and a light guide plate configured to guide light incident from the light source and emits a part of the light from a light exit surface. The light guide plate is provided with pixel regions each including one or more of light exit structures configured to change a direction of the incident light and emit the incident light from the light exit surface, the light guide plate being configured to display a predetermined image that has a tone caused by varying an amount of light emitted from each of the pixel regions. The amount of light emitted from the pixel region displaying the tone in a predetermined range is randomly set so as to be a first light amount value or a second light amount value greater than the first light amount value.

Moreover, in order to achieve the object, a game machine according to one aspect of the present invention is provided with the above display device, and the display device performs display in accordance with the progress of a game.

With the above configuration, the tone in the predetermined range is displayed with the amount of emitted light of the first light amount value or the second light amount value set randomly. Here, for example, in a case where the pixel region is set so that the amount of emitted light is associated with the tone value one to one, in actuality, the tone change and the change in amount of emitted light cannot be completely associated due to the limit of manufacturing accuracy. In this case, the change in amount of emitted light with respect to the tone change is made stepwise, and the image expression like gradation becomes unnatural.

On the other hand, with the above configuration, two types of pixel regions in which the amount of emitted light is the first light amount value and the second light amount value may only be provided as the structure for displaying the tone in the predetermined range. Therefore, it is quite possible to manufacture the structure as described above even when the manufacturing accuracy is relatively low. In addition, since the tone in the predetermined range is displayed with the amount of emitted light of the first light amount value or the second light amount value set randomly, it is possible to reduce a stepwise change in amount of emitted light with respect to the tone change. It is thus possible to make the image expression like gradation more natural.

In the display device, an entire tone range in the predetermined image may be divided into a plurality of partial tone ranges, and the first light amount value and the second light amount value may be set for each of the partial tone ranges.

With the above configuration, the adjustment of the amount of emitted light as described above is performed for each partial tone range with respect to all the tones. Therefore, natural image expression can be achieved with any tone.

In the display device, the number of partial tone ranges may be 10 or less.

The light guide plate is manufactured, for example, by forming a mold as a master and transfer-molding the master mold. The light exit structure is a minute structure, and there is a limit in the shape accuracy depending on the accuracy in mold formation and the accuracy in transfer molding. For example, assuming that the size of the light exit structure capable of emitting the maximum amount of light is 100%, when the number of partial tone ranges is greater than 10, the size of the smallest light exit structure may need to be made less than 10%. Here, even when the most accurate mold formation and transfer molding are performed, it is difficult to precisely manufacture a light exit structure having a size of less than 10%. In contrast, with the above configuration, since the number of partial tone ranges is 10 or less, the size of the smallest light exit structure can be made 10% or more. It is thus possible to provide a display device provided with a light exit structure having a certain degree of accuracy.

In the display device, the number of partial tone ranges may be five or less.

As described above, for example, assuming that the size of the light exit structure capable of emitting the maximum amount of light is 100%, when the size of the smallest light exit structure is less than 20%, the stability of the manufacturing accuracy of the light exit structure is low. Therefore, with the above configuration, since the number of partial tone ranges is 5 or less, it is possible to provide a display device provided with a light exit structure with high accuracy stability.

In the display device, the second light amount value of the highest partial tone range may be three or more times the second light amount value of the lowest partial tone range.

With the above configuration, the difference between the light amount values of the highest partial tone range and the lowest partial tone range can be increased to achieve the display of an image having sufficient tone expression.

In the display device, assuming that a difference between the second light amount value of a certain partial tone range and the second light amount value of a partial tone range that is one level lower than the partial tone range is a light amount value difference, light amount value differences in the entire tone range may not be constant.

With the above configuration, since the light amount value difference is not constant, more natural tone expression can be achieved. For example, by increasing the light amount value difference as the partial tone range becomes higher, it is possible to achieve a display in which the tone expression in a lower tone range is more delicate.

In the display device, the number of the light exit structures included in each of the pixel regions may be the same, and the shapes of the light exit structures may be made different to change the amount of light emitted from the pixel region.

With the above configuration, since the number of light exit structures included in each pixel region is the same, for example, at the time of manufacturing the light guide plate, the light exit structures can be formed at equal intervals. This can simplify the control at the time of manufacturing depending on the manufacturing method.

In the display device, the light exit structure may include an optical surface to change the direction of the incident light, and a length of the optical surface in a first direction vertical to the direction of the light incident from the light source as viewed from the light exit surface side may be made different to change the amount of light emitted from the pixel region.

With the above configuration, for example, when the shape of the light exit structure is formed by moving a cutting tool in the first direction and performing cutting, the movement amount in the first direction at the cutting with the cutting tool is controlled, so that it is possible to set the length of the optical surface in the second direction. The light exit structure can thus be manufactured by relatively simple control.

In the display device, the light exit structure includes an optical surface to change the direction of the incident light, and a length of the optical surface in a second direction parallel to the direction of the light incident from the light source as viewed from the light exit surface side may be made different to change the amount of light emitted from the pixel region.

With the above configuration, for example, when the shape of the light exit structure is formed by moving the cutting tool in the first direction and performing cutting, the pressing amount at the cutting with the cutting tool is controlled so that it is possible to set the length of the optical surface in the second direction. The light exit structure can thus be manufactured by relatively simple control.

In the display device, the number of light exit structures included in each pixel region may be made different to change the amount of emitted light in the pixel region.

With the above configuration, it is possible to change the amount of emitted light without changing the shape of each light exit structure. Therefore, the same control can be applied to the manufacture of each light exit structure, and it is only necessary to change the number of light exit structures for each pixel region, so that the control of manufacture can be simplified depending on the manufacturing method.

In the display device, a plurality of light exit structure regions extending in the first direction may be provided in parallel so as to straddle a plurality of the pixel regions arranged in the first direction vertical to the direction of the light incident from the light source, and the number of the light exit structures included in the pixel region may be made different depending on whether to provide the light exit structure in the light exit structure region.

With the above configuration, for example, it is possible to form the shape of the light exit structure by performing cutting at a location where the light exit structure is to be provided while moving a cutting tool along the light exit structure region extending in the first direction. The light exit structure can thus be manufactured by relatively simple control.

The present invention is not limited to each of the embodiments described above but can be subjected to various changes in the scope illustrated in the claims. An embodiment obtained by appropriately combining technical units disclosed respectively in different embodiments is also included in the technical scope of the present invention.

DESCRIPTION OF SYMBOLS 1 display device
2 light source controller
3 light source
4 light guide plate
41 light exit surface
42 back side
43 light exit structure

The invention claimed is:
1. A display device comprising:
a light source; and
a light guide plate configured to guide light incident from the light source and emits a part of the light from a light exit surface,
wherein
the light guide plate is provided with pixel regions each including one or more of light exit structures configured to change a direction of the incident light and emit the incident light from the light exit surface, the light guide plate being configured to display a predetermined image that has a tone caused by varying an amount of light emitted from each of the pixel regions,
the amount of light emitted from the pixel region displaying a tone in a predetermined range is randomly set so as to be a first light amount value or a second light amount value greater than the first light amount value,
an entire tone range in the predetermined image is divided into a plurality of partial tone ranges, and
the first light amount value and the second light amount value are set for each of the partial tone ranges.

2. The display device according to claim 1, wherein the number of the partial tone ranges is equal to or smaller than 10.

3. The display device according to claim 1, wherein the number of the partial tone ranges is equal to or smaller than 5.

4. The display device according to claim 1, wherein the second light amount value of the highest partial tone range is equal to or greater than three times the second light amount value of the lowest partial tone range.

5. The display device according to claim 1, wherein assuming that a difference between the second light amount value of a certain partial tone range and the second light amount value of a partial tone range that is one level lower than the partial tone range is a light amount value difference, light amount value differences in the entire tone range is not constant.

6. The display device according to claim 1, wherein
the number of the light exit structures included in each of the pixel regions is the same, and
shapes of the light exit structures are made different to change the amount of light emitted from the pixel region.

7. The display device according to claim 6, wherein
each of the light exit structures includes an optical surface to change the direction of the incident light, and
a length of the optical surface in a first direction vertical to the direction of the light incident from the light source as viewed from a light exit surface side is made different to change the amount of light emitted from the pixel region.

8. The display device according to claim 6, wherein
each of the light exit structures includes an optical surface to change the direction of the incident light, and
a length of the optical surface in a second direction parallel to the direction of the light incident from the light source as viewed from a light exit surface side is made different to change the amount of light emitted from the pixel region.

9. The display device according to claim 1, wherein the number of the light exit structures included in the pixel region is made different to change the amount of light emitted from the pixel region.

10. The display device according to claim 9, wherein
a plurality of light exit structure regions extending in the first direction are provided in parallel so as to straddle a plurality of the pixel regions arranged in the first direction vertical to the direction of the light incident from the light source, and
the number of the light exit structures included in the pixel region is made different depending on whether to provide a light exit structure in the light exit structure region.

11. A game machine comprising
the display device according to claim 1,
wherein the display device performs display in accordance with progress of a game.

* * * * *